(12) United States Patent
Carteri et al.

(10) Patent No.: US 8,549,514 B2
(45) Date of Patent: Oct. 1, 2013

(54) DISTRIBUTING CUSTOMIZED SOFTWARE PRODUCTS

(75) Inventors: Francesco Maria Carteri, Rome (IT);
Alessandro Donatelli, Rome (IT);
Claudio Marinelli, Aprilia Latina (IT);
Luigi Pichetti, Rome (IT)

(73) Assignee: International Business Machines Corporation, Armonk, NY (US)

( * ) Notice: Subject to any disclaimer, the term of this patent is extended or adjusted under 35 U.S.C. 154(b) by 1339 days.

(21) Appl. No.: 12/048,355

(22) Filed: Mar. 14, 2008

(65) Prior Publication Data

US 2008/0229303 A1 Sep. 18, 2008

(30) Foreign Application Priority Data

Mar. 16, 2007 (EP) ..................... 07104326

(51) Int. Cl.
*G06F 9/44* (2006.01)
*G06F 9/445* (2006.01)

(52) U.S. Cl.
USPC ............ 717/177; 717/174; 717/120; 717/103

(58) Field of Classification Search
USPC ........................................ 717/168
See application file for complete search history.

(56) References Cited

U.S. PATENT DOCUMENTS

| 7,243,086 B2 | 7/2007 | Polak | |
|---|---|---|---|
| 7,249,354 B2 * | 7/2007 | Tigani et al. | 717/177 |
| 7,386,831 B2 * | 6/2008 | Flanagan | 717/103 |
| 7,392,523 B1 * | 6/2008 | Stahl et al. | 717/177 |
| 7,434,200 B2 | 10/2008 | Bender | |
| 7,478,362 B2 | 1/2009 | Gutz et al. | |
| 7,533,364 B2 * | 5/2009 | Ramaswamy et al. | 717/103 |

(Continued)

FOREIGN PATENT DOCUMENTS

| EP | 1457877 | 9/2004 |
|---|---|---|
| EP | 1684170 | 7/2006 |

(Continued)

OTHER PUBLICATIONS

Hassan Gomaa, Designing Concurrent, Distributed, and Real-Time Applications with UML, Jul. 2000, ISBN 0-201-65793-7, chapter 7, 8, 13, 14, 19, and 21.*

(Continued)

*Primary Examiner* — Thuy Dao
*Assistant Examiner* — Mongbao Nguyen
(74) *Attorney, Agent, or Firm* — Yee & Associates, P.C.; Jeffrey S. LaBaw (57) ABSTRACT

A solution for distributing software products in a data processing system is disclosed. A set of models of each software product is to be distributed (for example, of the UML type) is provided; each model includes an indication of relationships among a plurality of available logical items (representing functions provided by the software product, such as use cases) and a plurality of available distribution artifacts (used to distribute the software product). A set of logical items is then selected among the available ones. The process continues by identifying a set of distribution artifacts required to implement the selected logical items (among the available distribution artifacts); the required distribution artifacts are identified according to the corresponding relationships in the models. A software package is built including the required distribution artifacts. The software package is then distributed to a set of data processing entities of the system (i.e., endpoints), so as to cause each entity to install the required distribution artifacts on the entity.

18 Claims, 8 Drawing Sheets

(56) References Cited

U.S. PATENT DOCUMENTS

| | | | |
|---|---|---|---|
| 7,673,283 B2 | 3/2010 | Gutz et al. | |
| 7,676,786 B2 | 3/2010 | Shenfield et al. | |
| 7,840,935 B2 | 11/2010 | Fildebrandt et al. | |
| 7,873,942 B2 | 1/2011 | Shaburov et al. | |
| 7,904,875 B2 * | 3/2011 | Hegyi | 717/103 |
| 7,954,083 B2 | 5/2011 | Berenbach et al. | |
| 7,979,840 B2 | 7/2011 | Zhang et al. | |
| 8,255,901 B2 * | 8/2012 | Halbedel et al. | 717/174 |
| 8,271,934 B2 | 9/2012 | Carteri et al. | |
| 2004/0003369 A1 | 1/2004 | Gonos | |
| 2004/0025155 A1 * | 2/2004 | Sedlack et al. | 717/174 |
| 2004/0034850 A1 * | 2/2004 | Burkhardt et al. | 717/120 |
| 2005/0108684 A1 | 5/2005 | Sohn et al. | |
| 2005/0132326 A1 | 6/2005 | Chischportich et al. | |
| 2005/0132343 A1 | 6/2005 | Bender | |
| 2005/0137992 A1 | 6/2005 | Polak | |
| 2006/0010429 A1 | 1/2006 | Ihara | |
| 2006/0059027 A1 | 3/2006 | Berenbach et al. | |
| 2006/0101376 A1 | 5/2006 | Gutz et al. | |
| 2006/0168555 A1 * | 7/2006 | Ferrao et al. | 717/104 |
| 2006/0218548 A1 * | 9/2006 | Mason et al. | 717/174 |
| 2007/0006134 A1 | 1/2007 | Larvet et al. | |
| 2007/0074205 A1 * | 3/2007 | Tammana et al. | 717/177 |
| 2007/0168936 A1 | 7/2007 | Shaburov et al. | |
| 2007/0198968 A1 * | 8/2007 | Shenfield et al. | 717/104 |
| 2007/0234291 A1 * | 10/2007 | Ronen et al. | 717/120 |
| 2008/0120598 A1 * | 5/2008 | Imeshev | 717/120 |
| 2008/0127047 A1 | 5/2008 | Zhang et al. | |
| 2008/0141243 A1 * | 6/2008 | Sheppard et al. | 717/177 |
| 2008/0313599 A1 | 12/2008 | Carteri et al. | |

FOREIGN PATENT DOCUMENTS

| | | |
|---|---|---|
| EP | 1724681 | 11/2006 |
| JP | 5127878 A | 5/1993 |
| JP | 11259279 A | 9/1999 |
| JP | 2001312400 A | 11/2001 |
| JP | 2001344034 A | 12/2001 |
| JP | 2002157117 A | 5/2002 |
| JP | 2003162414 A | 6/2003 |
| JP | 2004348519 A | 12/2004 |
| JP | 2006350850 A | 12/2006 |
| WO | WO0020968 | 4/2000 |
| WO | WO03038609 | 5/2003 |
| WO | WO2004010292 | 1/2004 |

OTHER PUBLICATIONS

Simon Johnston, Rational UML Profile for Business Modeling, 2004, pp. 1-18.*

Liguo Yu, A Configuration Management Model for Software Product Line, 2006, pp. 1-6.*

John D. McGregor, Testing a Software Product Line, 2001, pp. 41-50.*

GOMAA, "Designing Software Product Lines with UML," Department of Information and Software Engineering, George Mason University, Fairfax, Virginia, Jun. 2004, 56 pages.

USPTO Office Action dated Dec. 13, 2011, regarding U.S. Appl. No. 12/138,639, 8 pages.

Notice of Allowance, dated May 17, 2012, regarding U.S. Appl. No. 12/138,639, 17 pages.

* cited by examiner

DISTRIBUTING CUSTOMIZED SOFTWARE PRODUCTS

FIELD OF THE INVENTION

The present invention relates to the data processing field. More specifically, the present invention relates to the distribution of software products.

BACKGROUND

Installation of software products is a very time consuming activity, especially in a data processing system including a great number of computers (or endpoints). A typical example is that of a large network with hundreds of endpoints, wherein software products are continually upgraded (for example, to be abreast of the information technology development or to adapt to organizational changes).

For this purpose, software distribution applications are available to facilitate the deployment of software products from a central site of the system. Typically, a software distribution application controls the building of software packages; each software package embeds an image of the corresponding software product (such as a compressed copy of its files). The software package is then distributed to selected endpoints, and it is applied on each one of them so as to enforce the installation of the desired software product. An example of commercial software distribution application available on the market is the "IBM Tivoli Configuration Manager or ITCM" by IBM Corporation.

Generally, the software products are provided in a single predefined configuration. Some software products are also available in some different editions. For example, it is possible to have a home edition (with functionality for private use) and a professional edition (with functionality for business use); another example is that of a basic edition (with reduced functionality) and an advanced edition (with full functionality).

Anyway, the software products to be distributed must be chosen among a few available versions thereof—down to a single one in many practical cases. Therefore, it is very difficult (if not impossible) for the software products to fit the actual needs of their users (on the different endpoints). As a result, the software products installed on each endpoint generally provide far more functions than it is necessary; moreover, it is often necessary to distribute a complete version of the software products because just a few required functions are not available in their reduced versions.

The above-mentioned problems adversely affect a footprint of the software products that are installed on the endpoints (for example, their mass memory occupation, working memory usage, and the like). Moreover, the images of the software products increase accordingly; this has a detrimental impact on the network traffic in the system for distributing the software products to the endpoints.

It should be noted that some authoring tools used to control the process of installing the software products on each endpoint (such as "InstallShield" by MicroVision Corporation) allow selecting desired functions of the software products during their installation. Nevertheless, all the available functions must be supported by the software products that are distributed to the endpoints (for their selection). Therefore, the complete software products must always be distributed to the endpoints, with the above-mentioned drawbacks.

SUMMARY

In its general terms, the present disclosure is based on the idea of customizing the software products to be distributed.

Particularly, the present invention provides a solution as set out in the independent claims. Advantageous embodiments of the invention are described in the dependent claims.

More specifically, an aspect of the invention proposes a method for distributing software products in a data processing system. The method starts with the step of providing a set of (one or more) models of each software product to be distributed. The models include an indication of relationships among a plurality of available logical items (representing functions provided by the software product) and a plurality of available distribution artifacts (used to distribute the software product). A set of (one or more) logical items is selected among the available logical items. The method continues by identifying a set of (one or more) distribution artifacts required to implement the selected logical items (among the available distribution artifacts); the required distribution artifacts are identified according to the corresponding relationships in the models. A software package is built including the required distribution artifacts. The software package is then distributed to a set of (one or more) data processing entities of the system, so as to cause each entity to install the required distribution artifacts on the entity.

Preferably, this process involves updating the selected logical items by adding each available logical item depending on at least one of them (according to the models).

In an embodiment of the invention, the logical items include features (each one indicative of an application activity enabled by the software product).

In addition or in alternative, the logical items include use cases (each one indicative of an application scenario enabled by the software product), from which the corresponding features are determined according to the models.

A proposed implementation involves determining the required distribution artifacts from the selected features.

A way to further improve the solution is to determine the logical items already available on each entity, and then disregard them in the building of the corresponding software package.

For example, this result may be achieved by storing an indication of the features available on the entity (in response to the installation of the corresponding distribution artifacts).

In an embodiment of the invention, the proposed solution is implemented by means of a service.

Another aspect of the invention proposes a computer program for performing the above-described method.

A different aspect of the invention proposes a corresponding system.

BRIEF DESCRIPTION OF THE DRAWINGS

The invention itself, as well as further features and the advantages thereof, will be best understood with reference to the following detailed description, given purely by way of a non-restrictive indication, to be read in conjunction with the accompanying drawings, in which.

DETAILED DESCRIPTION

Figure 1A:
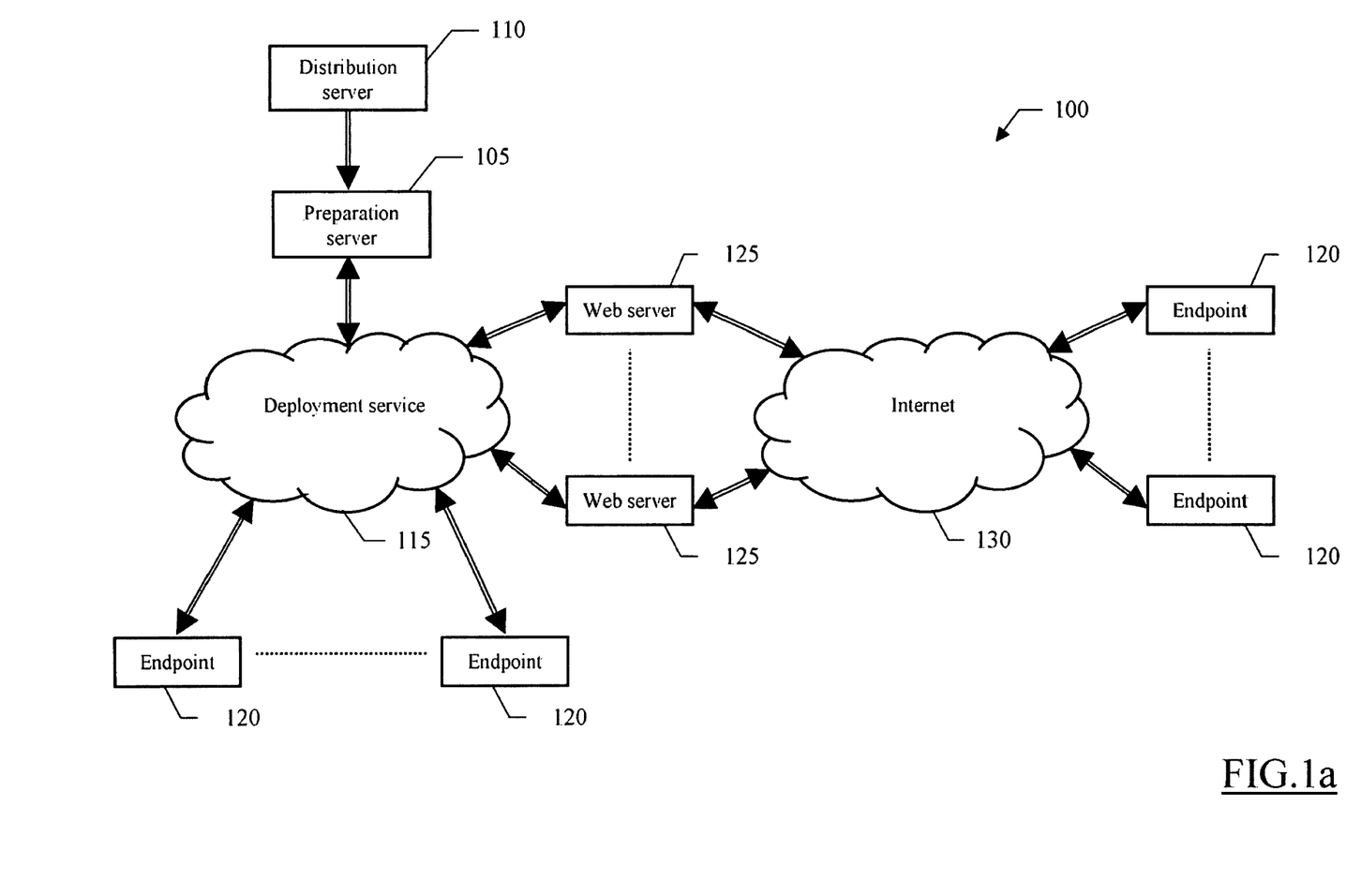
FIG. 1*a* is a schematic block diagram of a data processing system in which the solution according to an embodiment of the invention is applicable.

With reference in particular to FIG. 1a, a data processing system 100 with distributed architecture is illustrated. The system 100 implements a software distribution infrastructure (for example, based on the above-mentioned ITCM).

Particularly, a preparation server 105 operates as a central site for defining, testing and building software packages to be used for installing desired software products in the system 100. Each software package embeds an image of a corresponding software product; the image consists of the resources that are required for the installation of the software product, such as executable modules, libraries, configuration tables, databases, and the like (typically, in the form of compressed files). The software package also includes commands that specify the actions to be carried out for installing the software product (such as add, delete, or update files, registry entries, and the like).

A distribution server 110 controls the deployment of the software packages in the system 100. For this purpose, the distribution server 110 deploys specific software packages from the preparation server 105 (acting as a source host providing the desired software packages) by means of a corresponding service 115 (for example, consisting of the "Multiplexed Distribution or MDIST2" service based on the "Tivoli Management Framework or TMF" by IBM Corporation).

The software packages may be directly provided (in push mode) to endpoints 120, wherein they are applied so as to install the corresponding software products; this result is achieved operating in a disconnected mode (wherein a set of software packages is deployed to selected endpoints 120 according to a predefined plan) or in a real time mode (in response to specific requests entered through a command line interface, or CLI).

The software packages may also be provided in a similar way to web servers 125, which publish them for authorized users (or groups of users) of the endpoints 120. The endpoints 120 access the web servers 125 through the Internet 130. In this way, the endpoints 120 (of the authorized users) may select and download (in pull mode) desired software packages from the web servers 125; these software packages are then applied on each endpoint 120 to install the corresponding software products as above.

Figure 1B:
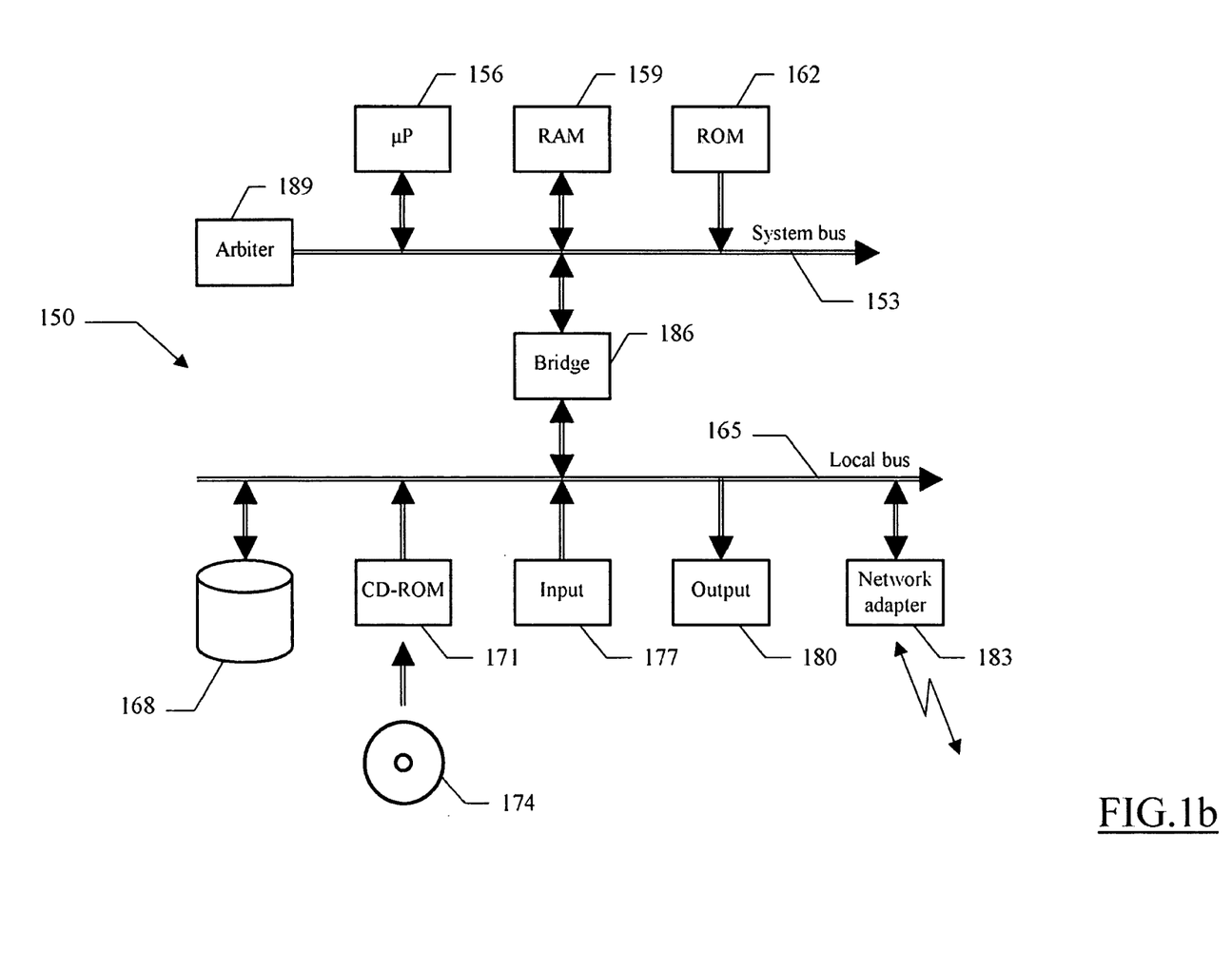
FIG. 1*b* shows the functional blocks of an exemplary computer of the system.

Moving now to FIG. 1b, a generic computer of the above-described system (i.e., preparation server, distribution server, endpoint or web server) is denoted with 150. The computer 150 is formed by several units that are connected in parallel to a system bus 153 (with a structure that is suitably scaled according to the actual function of the computer 150 in the system). In detail, one or more microprocessors (μP) 156 control operation of the computer 150; a RAM 159 is directly used as a working memory by the microprocessors 156, and a ROM 162 stores basic code for a bootstrap of the computer 150. Several peripheral units are clustered around a local bus 165 (by means of respective interfaces). Particularly, a mass memory consists of one or more hard-disks 168 and drives 171 for reading CD-ROMs 174. Moreover, the computer 150 includes input units 177 (for example, a keyboard and a mouse), and output units 180 (for example, a monitor and a printer). A network adapter 183 is used to plug the computer 150 into the system. A bridge unit 186 interfaces the system bus 153 with the local bus 165. Each microprocessor 156 and the bridge unit 186 can operate as master agents requesting an access to the system bus 153 for transmitting information. An arbiter 189 manages the granting of the access with mutual exclusion to the system bus 153.

Figure 2:
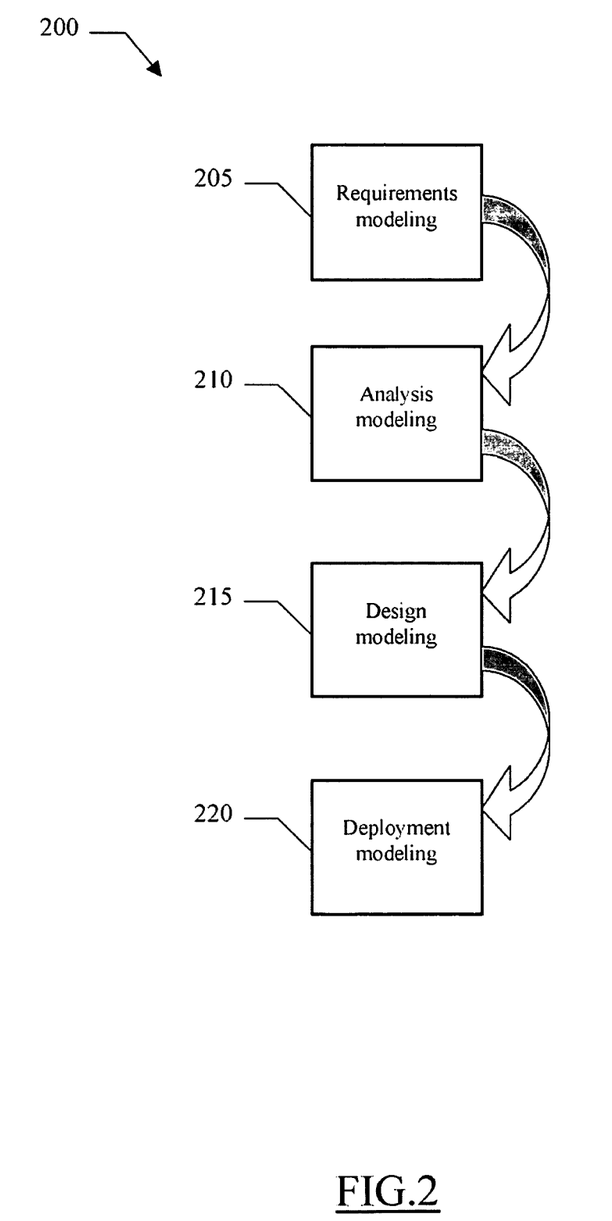
FIG. 2 is a flow chart describing the typical activities performed during the development of a generic software product.

With reference to FIG. 2, a developing process 200 of a generic software product (to be distributed in the above-described system) typically includes a sequence of modeling phases. In this way, the software product is represented by means of models, which provide different levels of abstraction of real aspects of the software product; each model includes a number of stereotypes (each one for a corresponding aspect of the software product) with respective relationships. This allows visualizing, assessing and communicating the software product before its actual implementation (so as to reduce the corresponding development risks). For example, the models are defined by using the Unified Modeling Language (UML); the UML is a standard modeling language, which provides a (graphical and textual) syntax and an underlying semantic for specifying all the aspects relating to the development of software products (especially of the object-oriented type).

Particularly, the development process 200 starts with a requirements modeling 205 (aimed at specifying the functions to be provided by the software product); for this purpose, the requirements are collected from corresponding users, checked for completeness and consistency, and then formalized into a proper definition. For example, the requirements of the software product are represented by use cases (describing application scenarios enabled by the software product) or features (describing application activities enabled by the software product).

The requirements modeling 205 is followed by an analysis modeling 210. In this phase, the requirements are converted into a corresponding architecture of the software product (independent of any implementation details). For example, the analysis of the software product is represented by controls (for its processing items), entities (for its data items), and interfaces (for its user-interaction items).

The development process 200 continues with a design modeling 215, wherein the actual architecture of the software product (based on its implementation technology) is derived from the analysis thereof. For example, the design of the software product is represented by components (each one offering a predefined service and being able to communicate with other components), in turn including classes, interfaces, objects, and the like.

At the end, a deployment modeling 220 defines the structure of the software product for its distribution. For example, the deployment of the software product is represented by distribution artifacts (to be embedded in its image) and nodes (wherein these artifacts must be installed).

In the solution according to an embodiment of the present invention, as described in detail in the following, the models of the software product are used to select the functions to be provided (such as its use cases). The same models allow identifying the artifacts, which are required to implement the selected functions (according to their relationships defined in the models). The software package to be used for distributing the software product is then built by embedding these required artifacts.

The proposed solution makes it possible to customize the software products to be distributed. As a result, it is possible to create software products that actually fit the needs of their users (on the different endpoints).

Therefore, the software products installed on each endpoint will provide exactly the functions that are necessary; this avoids distributing software products with functions that are not required.

The devised solution reduces a footprint of the software products that are installed on each endpoint (for example, their mass memory occupation, working memory usage, and the like). Moreover, the images of the software products decrease accordingly; this has a beneficial impact on the network traffic in the system for distributing the software products to the endpoints.

The devised solution fosters a full componentization of the software products. Indeed, it is now possible to design the software products with independent components (suitable to be reused in different contexts); these components are then assembled together in the images of the software product upon request (to implement the corresponding functions).

It should be noted that the identification of the required artifacts by means of the models of the software products ensures the compliance with the conditions necessary for their correct operation. This result is achieved without any additional effort, since the models are already available as a byproduct of the development process of the software products.

Figure 3A:
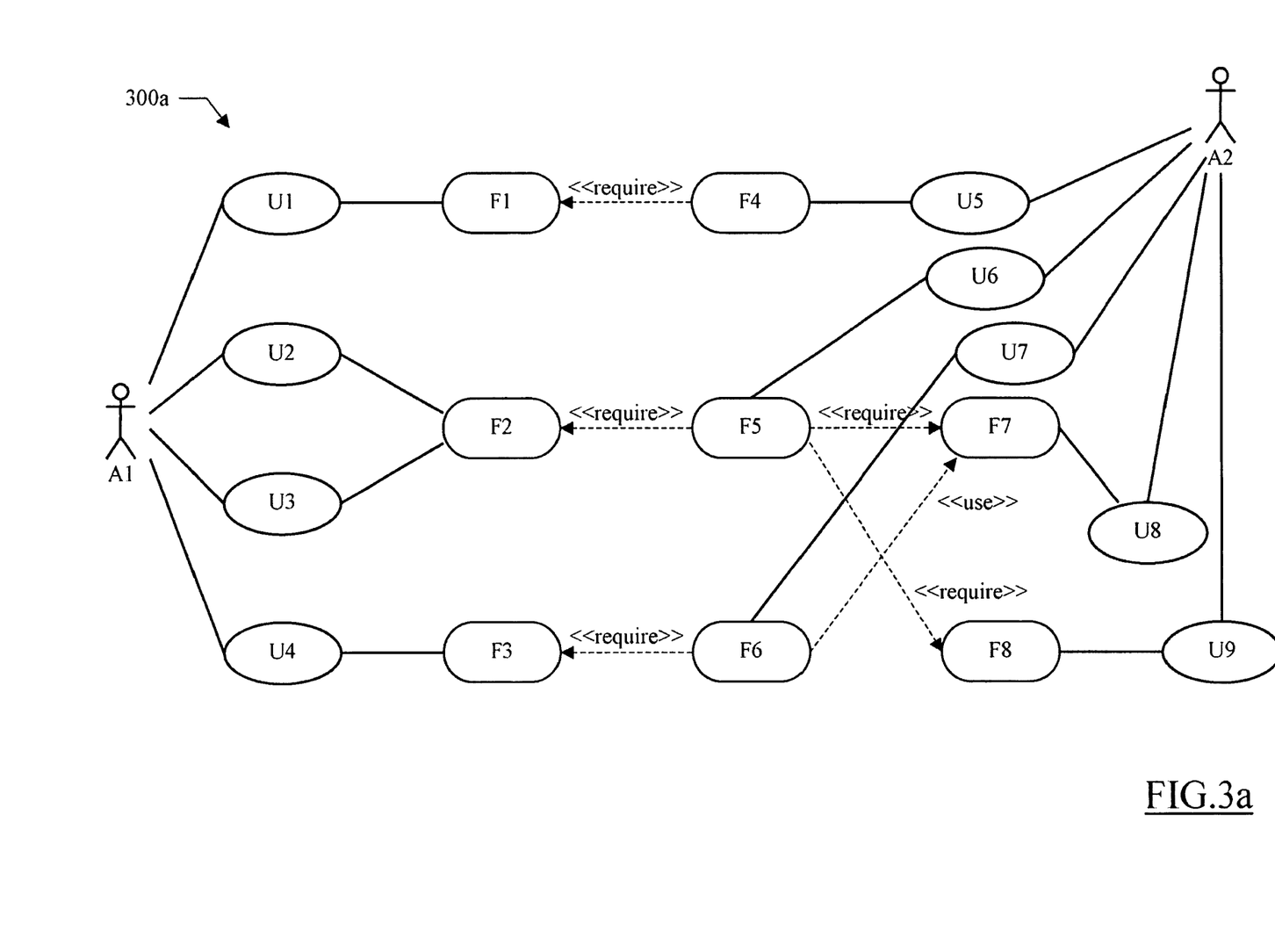
FIGS. 3*a*-3*c* are diagrams illustrating a requirements model, a design model and a deployment model, respectively, relating to an exemplary application of the solution according to an embodiment of the present invention.
Figure 3B:
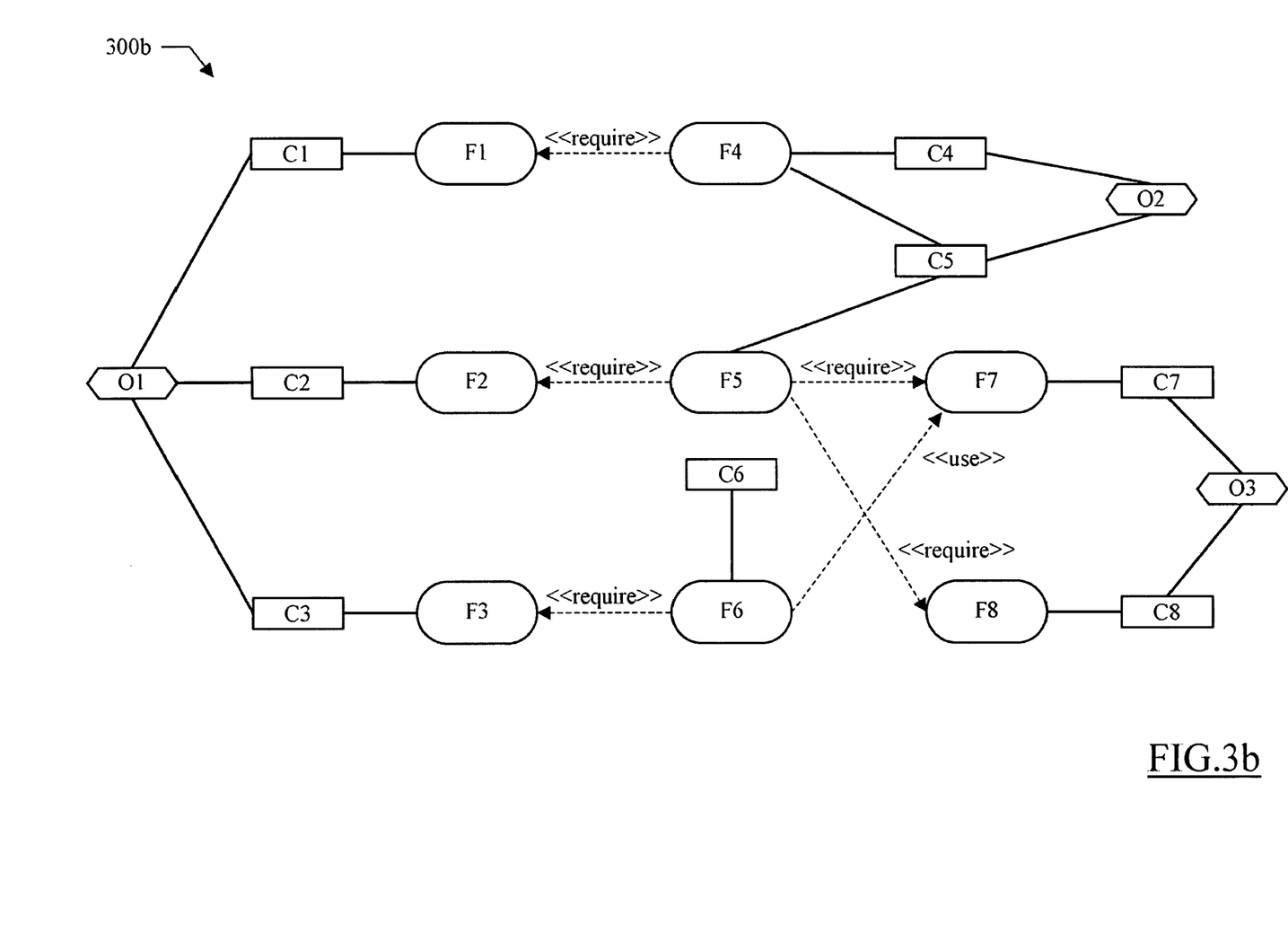
Figure 3C:
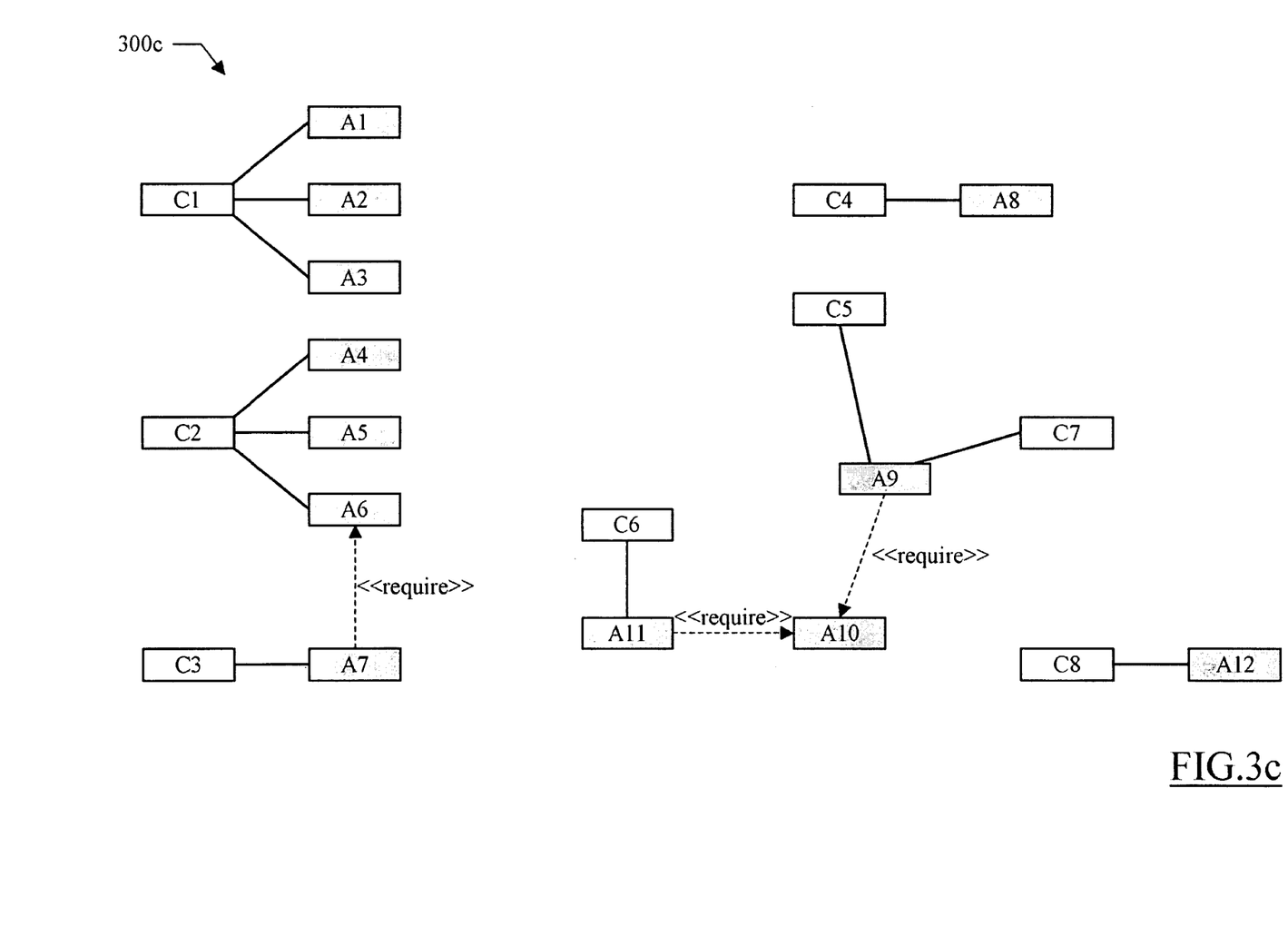

An exemplary scenario of application of the solution according to an embodiment of the present invention is illustrated in FIGS. 3a-3c; the figures show different diagrams representing corresponding models graphically (as defined by the UML standard).

Particularly, FIG. 3a illustrates a requirements diagram 300a (which models the functions provided by the software product through its use cases). In detail, two actors A1,A2 play the role of users of the software product. The actors A1,A2 carry out different use cases U1-U9 (as indicated by corresponding associations). Each use case U1-U9 exposes one or more features F1-F8 (as indicated by further associations). Different relationships are defined among the features F1-F8. For example, a (source) feature may "require" a (target) feature—as indicated by a corresponding dependency, represented with a dashed-line arrow, meaning that the target feature is mandatory for the operation of the source feature. On the other hand, a (source) feature may "use" a (target) feature—as indicated by a corresponding dependency, represented again with a dashed-line arrow, meaning that the source feature may invoke the (optional) target feature when it is available.

The requirements diagram 300a is exploited by a system administrator to select the use cases U1-U9 enabling the desired functions of the software product to be distributed. In this way, it is possible to determine the corresponding features F1-F8 that are exposed by the selected use cases U1-U9 (according to the corresponding associations). The (selected) features F1-F8 so determined are then updated by adding any further feature F1-F8, which is required by one or more of the selected features F1-F8 (according to the corresponding dependencies). For example, if the administrator selects the use case U7, the corresponding selected features will be F6 (enabled by the selected use case U7) and F3 (required by the selected feature F6).

FIG. 3b instead illustrates a design diagram 300b (which models the architecture of the software product through its components). In detail, the above-described features F1-F8 (with their dependencies) are implemented by means of different components C1-C8 exposing their functions (as indicated by corresponding associations). The components C1-C8 may also be federated into offerings O1-O3, each one grouping together correlated components C1-C8 (as indicated by further associations).

The design diagram 300b may be exploited (in alternative to the above-described requirements diagram) directly to select the features F1-F8 enabling the desired functions of the software product to be distributed. As above, the selected features F1-F8 are then updated by adding any further feature F1-F8, which is required by one or more of the selected features F1-F8 (according to the corresponding dependencies).

In any case, the design diagram 300b makes it possible to determine the components C1-C8 corresponding to the selected features F1-F8 (either derived from the use cases selected in the requirements diagram or selected in the design diagram directly), which (selected) components C1-C8 implement the selected features F1-F8 (according to the corresponding associations). In the example at issue, the selected components for the selected features F3 and F6 will be C3 and C6, respectively.

At the end, FIG. 3c illustrates a deployment diagram 300c (which models the distribution structure of the software product through its artifacts). In detail, the above-described components C1-C8 are traced by means of different artifacts A1-A12. The artifacts A1-A12 may be linked by further relationships. For example, as above a (source) artifact may "require" a (target) artifact—as indicated by a corresponding dependency, represented with a dashed-line arrow, meaning that the target artifact is mandatory for the installation of the source artifact.

The deployment diagram 300c is exploited to identify the artifacts A1-A12 tracing the selected components C1-C8 (i.e., required for implementing the corresponding functions of the software product to be distributed). The required artifacts A1-A12 are then updated by adding any further artifact A1-A12, which is required by one or more of these required artifacts A1-A12 (according to the corresponding dependencies). In the example at issue, the required artifacts for the selected components C3 and C6 will be A7 and A11 (tracing the selected components C3 and C6, respectively), plus A6 and A10 (required by the required artifacts A7 and A11, respectively); it is then possible to build a software package embedding these required artifacts A6,A7,A10,A11 so as to obtain the installation of the software product with the desired functions (provided by the selected use case U7, that is, by the selected features F3,F6, that is, by the selected components C3,C6).

Figure 4:
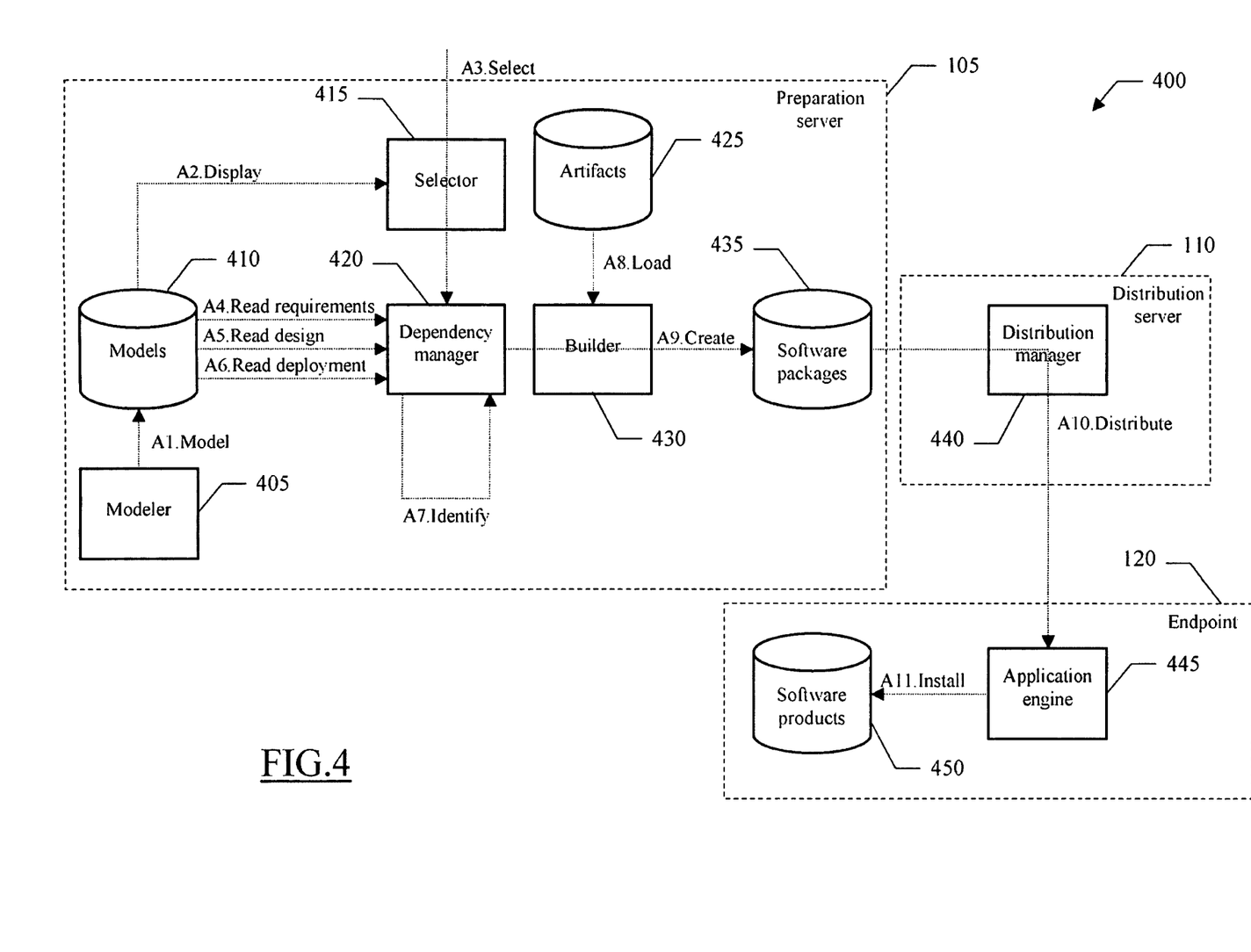
FIG. 4 is a collaboration diagram representing the roles of different modules that may be used to implement the solution according to an embodiment of the invention.

Considering now FIG. 4, a collaboration diagram 400 representing the roles of different modules that may be used to implement the solution according to an embodiment of the invention is illustrated. The figure describes the static structure of the system (by means of the corresponding modules) and its dynamic behavior (by means of a series of exchanged messages, each one representing a corresponding action, denoted with sequence numbers preceded by the symbol "A").

Particularly, the preparation server 105 includes a modeler 405. The modeler 405 is used by developers (i.e., architects, analysts, designers, and programmers) to define the corresponding models of each available software product; typically, the modeler 405 provides an Integrated Development Environment (IDE), which also facilitates the generation of the corresponding code. An example of commercial modeler 405 is the "Rational Rose" by IBM Corporation. The definitions of the models are saved into a repository 410, for example, by means of corresponding files in the XML Metadata Interchange (XMI) format (action "A1.Model").

The modeler 405 provides a graphical user interface (GUI) that allows displaying the diagrams representing specific models extracted from the model repository 410 (action "A2.Display"). A plug-in of the modeler 405 implements a selector 415, which is used by the administrator to select the desired functions (i.e., use cases and/or features) of each software product to be distributed—for example, by double clicking on corresponding icons on the graphical representation of the relevant models (action "A3.Select").

The preparation server 105 is also provided with a dependency manager 420. The dependency manager 420 accesses the model repository 410, so as to read the requirements models (action "A4.Read requirements"), the analysis/design models (action "A5.Read design") and the deployment models (action "A6.Read deployment"). The dependency manager 420 then identifies the artifacts required by the selected functions according to their relationships, as defined in the relevant models (action "A7.Identify").

All the artifacts available for distributing any software product are stored in a repository 425. A builder 430 loads the required artifacts corresponding to the selected functions of the software products to be distributed from the artifacts repository 425 (action "A8.Load"). The builder 430 creates the proper software package for each software product to be distributed by embedding the corresponding required artifacts; the software packages so obtained are stored into a repository 435 (action "A9.Create").

Moving now to the distribution server 110, a distribution manager 440 generates distribution plans (each one consisting of a list of activities specifying the installation of specific software packages on selected endpoints 120). The plans may be created in the disconnected mode by a dedicated service (such as the "Change Manager or CM" of the "ITCM"), according to predefined reference models specifying a desired configuration of each endpoint subscribing to the reference model (identified according to a role thereof); alternatively, the plans may be created in the run-time mode (in response to command line requests), so as to distribute selected software packages manually to a set of endpoints 120 at a time. In any case, the distribution manager 440 submits the execution of each plan by means of a corresponding service (such the "Activity Planner Manager or APM" of the "ITCM"), which controls the execution of the corresponding activities; as a result, each software package specified in the plan is extracted from its repository 435 and then distributed to the desired endpoints 120 (action "A10.Distribute").

A generic endpoint 120 of the system includes an application engine 445 (such as the "Software Installation Engine or SIE" service of the "ITCM"). The application engine 445 enforces the application of each received software package on the endpoint 120. This involves the execution of the commands specified in the software package, which commands are required to reach its desired status (i.e., installed). As a result, the corresponding software product (generically denoted with 450 in the figure) will be installed on the endpoint 120 (only with the desired functions).

Figure 5:
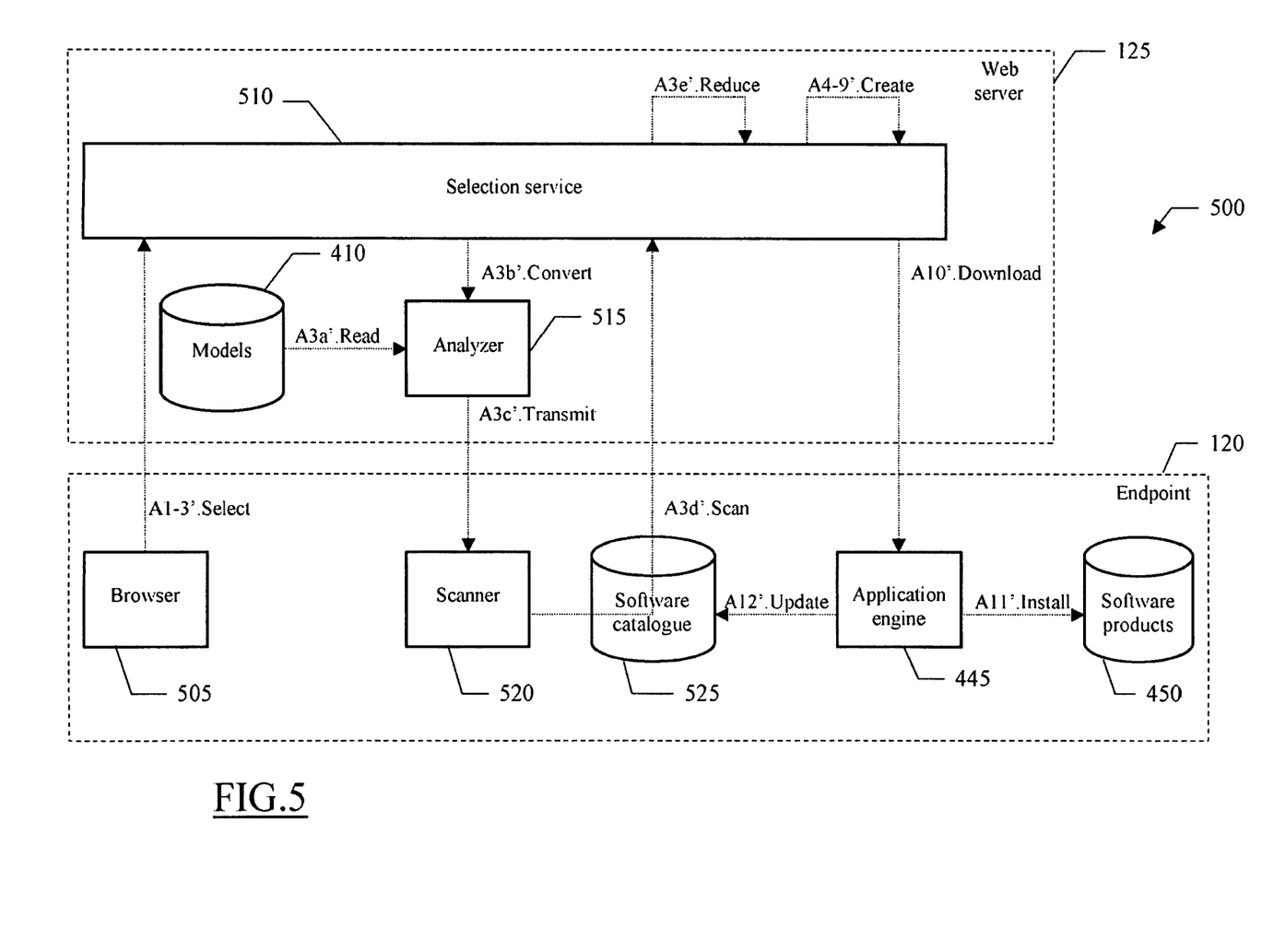
FIG. 5 is a collaboration diagram relating to a different embodiment of the invention.

Moving now to FIG. 5, a collaboration diagram 500 relating to the implementation of the solution according to another embodiment of the invention is illustrated.

In this case, each endpoint 120 is provided with a browser 505 for surfing the Internet. Particularly, the browser 505 is used to access a selection service 510 exposed by each web server 125 (for example, implemented by means of a web service). The selection service 510 provides a remote front-end, which allows the user of the endpoint 120 to select each desired software product to be installed; as above, the user may also select specific functions (i.e., use cases and/or features) to be included in the software product (action "A1-3'.Select"). Therefore, the user is directly allowed to customize the software product to be installed on its endpoint 120 at will.

In response thereto, an analyzer 515 reads the requirements models from the model repository 410 (action "A3a'.Read"). The analyzer 515 then determines the features corresponding to the selected functions according to their relationships (action "A3b'.Convert"). The analyzer 515 transmits a list of the selected features of the desired software product to a scanner 520 of the same endpoint 120 (action "A3c'.Transmit"). The scanner 520 determines which features (among the selected ones) are already available on the endpoint 120. For this purpose, the scanner 520 accesses a software catalogue 525. The software catalogue 525 stores an indication of all the software products that are installed on the endpoint 120; for each installed software product, the software catalogue 525 indicates the available features (corresponding to the installed artifacts). The scanner 520 then returns a list of the available features to the selection service 510 (action "A3d'Scan"). In response thereto, the selection service 510 reduces the selected features of the desired software product by removing the ones already available on the endpoint 120 (action "A3e'.Reduce").

The selection service 510 creates the software package for distributing the desired software product by embedding the artifacts required to implement the (reduced) selected features—repeating the same operations described above (action "A4-9'.Create"). In this case, however, the software package also includes an indication of the selected features implemented by the required artifacts embedded in the software package (for example, in a dedicated field of its header). The selection service 510 downloads the software package so obtained to the endpoint 120 (action "A10'.Download"). It should be noted that the software package now includes only the required artifacts corresponding to the selected features that are not available yet on the endpoint 120. Therefore, the image of the software package is further reduced, thereby saving additional network traffic for its downloading.

The application engine 445 of the endpoint 120 again applies the received software package, so as to enforce the installation of the corresponding software product 450 with the selected features that are not available yet on the endpoint 120 (actions "A11'.Install"). At the same time, the application engine 445 updates the software catalogue 525 accordingly (by exploiting the information included in the software package). Particularly, if the software product 450 was not available on the endpoint 120, a corresponding entry is added with the indication of all its selected features; conversely, the new selected features of the (preexisting) software product 450 are added to its entry in the software catalogue 525 (action "A12'.Update").

Naturally, in order to satisfy local and specific requirements, a person skilled in the art may apply to the solution described above many logical and/or physical modifications and alterations. More specifically, although the present invention has been described with a certain degree of particularity with reference to preferred embodiment(s) thereof, it should be understood that various omissions, substitutions and changes in the form and details as well as other embodiments are possible. Particularly, the proposed solution may even be practiced without the specific details (such as the numerical examples) set forth in the preceding description to provide a more thorough understanding thereof; conversely, well-known features may have been omitted or simplified in order not to obscure the description with unnecessary particulars. Moreover, it is expressly intended that specific elements and/ or method steps described in connection with any disclosed embodiment of the invention may be incorporated in any other embodiment as a matter of general design choice.

Particularly, the proposed solution lends itself to be implemented with an equivalent method (by using similar steps, removing some steps being non-essential, or adding further optional steps); moreover, the steps may be performed in a different order, concurrently or in an interleaved way (at least in part).

The software distribution infrastructure described above must not be interpreted in a limitative manner. For example, similar considerations apply if the preparation server and the distribution server are collapsed into a single computer, if the software packages have an equivalent structure or they include equivalent distribution artifacts; likewise, the software packages may be built dynamically when they are to be distributed, or the distribution of the software packages may be controlled in any other way (for example, only in the disconnected mode, only in the run-time more, or in any other way). Moreover, the term installation as used herein indicates any activity relating to the enforcement of a generic software product in the broadest acception of the term (including its addition, upgrading, maintenance, configuration, and the like).

Nothing prevents resolving the dependencies at any other modeling level (such as in the requirements models, analysis models, design models and/or deployment models); for example, it is possible to identify only the artifacts corresponding to the functions directly selected, and then add any other artifacts required by them.

Of course, the above-mentioned stereotypes defining the functions of the software products are not exhaustive. For example, as pointed out above, the desired functions of the software products may be defined by selecting either the use cases or the features; alternatively, it would also be possible to select packages (grouping multiple use cases relating to a complex scenario), directly the components or the offerings, and the like. Moreover, the functions may be selected by means of other diagrams (for example, activity diagrams or statecharts diagrams), or in any other way (even with no graphical interface). More generally, the proposed solution may be applied to the selection of whatever logical items, each one indicative of a (simple or complex) function provided by the software product.

Similar considerations apply if other relationships are taken into account for identifying the artifacts corresponding to the selected functions (for example, "realize", "form", and the like). As above, the same result may be achieved by exploiting different diagrams (for example, class diagrams or object diagrams).

Nothing prevents using any other modeling tool to develop the software products (for example, supporting different phases of the development process). In any case, alternative formalisms may be used to define the models of the software product—at the level of its requirements, analysis, design and/or deployment (for example, based on Petri networks). More generally, the proposed solution lends itself to be implemented with one or more generic models of the software product, which provide any indication of whatever relationships among the available logical items and the available distribution artifacts thereof.

It should be readily apparent that the additional characteristic relating to the verification of the features already available on the endpoints may also be applied to distribution modes different from the one based on the web service (for example, in the above-described run-time mode). In any case, this feature is not strictly necessary and it may be omitted in a simplified implementation of the proposed solution.

Alternatively, the same result may also be achieved by maintaining a global catalogue of the features of the different software products installed on all the endpoints (for example, on the distribution server). Moreover, it is possible to operate at the level of use cases, components, or even directly at the level of artifacts.

Although in the preceding description reference has been made to a specific service that is deployed by the web servers, this is not to be intended as a limitation; for example, nothing prevents implementing the desired service with another technology (even not based on the Internet), or to control it by one or more other service providers (such as the distribution server directly).

Similar considerations apply if the program (which may be used to implement each embodiment of the invention) is structured in a different way, or if additional modules or functions are provided; likewise, the memory structures may be of other types, or may be replaced with equivalent entities (not necessarily consisting of physical storage media). In any case, the program may take any form suitable to be used by or in connection with any data processing system, such as external or resident software, firmware, or microcode (either in object code or in source code—for example, to be compiled or interpreted). Moreover, it is possible to provide the program on any computer-usable medium; the medium can be any element suitable to contain, store, communicate, propagate, or transfer the program. For example, the medium may be of the electronic, magnetic, optical, electromagnetic, infrared, or semiconductor type; examples of such medium are fixed disks (where the program can be pre-loaded), removable disks, tapes, cards, wires, fibers, wireless connections, networks, broadcast waves, and the like. In any case, the solution according to the present invention lends itself to be implemented with an application having a different architecture (for example, working on a single server), with a hardware structure (for example, integrated in a chip of semiconductor material), or with a combination of software and hardware.

The proposed method may also be carried out on a system having a different topology or including equivalent units (for example, based on a local network). Moreover, each computer may have another structure or may include similar elements (such as cache memories temporarily storing the programs or parts thereof to reduce the accesses to the mass memory during execution); in any case, it is possible to replace the computer with any code execution entity (such as a PDA, a mobile phone, and the like), or with a combination thereof (such as a client/server architecture, a grid computing infrastructure, and the like).

The invention claimed is:

1. A method for distributing software products in a data processing system, the method including the steps of:
providing a set of models of each software product to be distributed, the models including an indication of relationships among a plurality of available logical items, representing functions provided by the software product, and a plurality of available distribution artifacts, used to distribute the software product,
selecting a set of logical items among the available logical items,
identifying a set of distribution artifacts required to implement the selected logical items among the available distribution artifacts, the required distribution artifacts being identified according to the corresponding relationships in the models, building a software package including the required distribution artifacts, and distributing the software package to a set of data processing entities of the system to cause each entity to install the required distribution artifacts on the entity, further including the steps for each entity of:

determining the logical items being available on the entity, the available logical items being implemented by the corresponding required distribution artifacts installed on the entity, and disregarding the available logical entities in the step of identifying the required distribution artifacts for building the software package to be distributed to the entity.

2. The method according to claim 1, wherein the step of identifying the required distribution artifacts includes:

updating the selected logical items by adding each available logical item depending on at least one of the selected logical items according to the models.

3. The method according to claim 1, wherein the logical items include features each one indicative of an application activity enabled by the software product.

4. The method according to claim 3, wherein the logical items include use cases each one indicative of an application scenario enabled by the software product, the step of identifying the required distribution artifacts including:

determining the features corresponding to the selected use cases according to at least one of the models including an indication of available features being exposed by the available use cases.

5. The method according to claim 3, wherein the step of identifying the required distribution artifacts includes:

identifying the distribution artifacts corresponding to the features according to at least one of the models including an indication of the available distribution artifacts tracing the available features.

6. The method according to claim 1, wherein the step of determining the available logical items includes:

storing an indication of the features being available on the entity in response to the installation of the corresponding required distribution artifacts on the entity, and retrieving the stored indication of the available features.

7. The method according to claim 1, wherein the execution of the steps of the method is controlled by at least one service provider.

8. A computer program product comprising a non-transitory computer-usable storage medium having program code stored thereon for performing a method for distributing software products in a data processing system when the program code is executed on the data processing system comprising the steps of:

providing a set of models of each software product to be distributed, the models including an indication of relationships among a plurality of available logical items, representing functions provided by the software product, and a plurality of available distribution artifacts, used to distribute the software product, selecting a set of logical items among the available logical items, identifying a set of distribution artifacts required to implement the selected logical items among the available distribution artifacts, the required distribution artifacts being identified according to the corresponding relationships in the models, building a software package including the required distribution artifacts, and distributing the software package to a set of data processing entities of the system to cause each entity to install the required distribution artifacts on the entity, further including the steps for each entity of:

determining the logical items being available on the entity, the available logical items being implemented by the corresponding required distribution artifacts installed on the entity, and disregarding the available logical entities in the step of identifying the required distribution artifacts for building the software package to be distributed to the entity.

9. A system for distributing software products in a data processing system including a data processor coupled to a memory including instructions that are executable by the data processor for performing a method comprising the steps of:

providing a set of models of each software product to be distributed, the models including an indication of relationships among a plurality of available logical items, representing functions provided by the software product, and a plurality of available distribution artifacts, used to distribute the software product, selecting a set of logical items among the available logical items, identifying a set of distribution artifacts required to implement the selected logical items among the available distribution artifacts, the required distribution artifacts being identified according to the corresponding relationships in the models, building a software package including the required distribution artifacts, and distributing the software package to a set of data processing entities of the system to cause each entity to install the required distribution artifacts on the entity, further including the steps for each entity of:

determining the logical items being available on the entity, the available logical items being implemented by the corresponding required distribution artifacts installed on the entity, and disregarding the available logical entities in the step of identifying the required distribution artifacts for building the software package to be distributed to the entity.

10. The system according to claim 9, wherein the logical items include features each one indicative of an application activity enabled by the software product.

11. The system according to claim 10, wherein the logical items include use cases each one indicative of an application scenario enabled by the software product, the step of identifying the required distribution artifacts including:

determining the features corresponding to the selected use cases according to at least one of the models including an indication of available features being exposed by the available use cases.

12. The system according to claim 10, wherein the step of identifying the required distribution artifacts includes:

identifying the distribution artifacts corresponding to the features according to at least one of the models including an indication of the available distribution artifacts tracing the available features.

13. The system according to claim 9, wherein the step of determining the available logical items includes:

storing an indication of the features being available on the entity in response to the installation of the corresponding required distribution artifacts on the entity, and retrieving the stored indication of the available features.

14. The system according to claim 9, wherein determining the logical items being available on the entity comprises:

accessing a software catalog that includes a list of products installed at the entity and features provided by such products.

15. The system according to claim 9, wherein the selecting step is performed responsive to a user-initiated command received by the entity.

16. The method according to claim 1, wherein determining the logical items being available on the entity comprises:
    accessing a software catalog that includes a list of products installed at the entity and features provided by such products.

17. The method according to claim 6, wherein the indication is stored at the entity.

18. The method according to claim 1, wherein the selecting step is performed responsive to a user-initiated command received by the entity.

* * * * *